US012786944B2

(12) United States Patent
Vijayakumar et al.

(10) Patent No.: US 12,786,944 B2
(45) Date of Patent: Nov. 3, 2026

(54) CELLULAR COVERAGE ACQUISITION SYSTEMS AND METHODS

(71) Applicant: Boost SubscriberCo L.L.C., Englewood, CO (US)

(72) Inventors: Nikhil Rangaraajan Vijayakumar, Littleton, CO (US); Rohit Singh, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 223 days.

(21) Appl. No.: 18/890,431

(22) Filed: Sep. 19, 2024

(65) Prior Publication Data

US 2026/0082352 A1 Mar. 19, 2026

(51) Int. Cl.
*H04W 64/00* (2009.01)
*H04W 76/10* (2018.01)

(52) U.S. Cl.
CPC .......... *H04W 64/00* (2013.01); *H04W 76/10* (2018.02)

(58) Field of Classification Search
CPC .............................. H04W 64/00; H04W 76/10
See application file for complete search history.

(56) References Cited

U.S. PATENT DOCUMENTS

| | | | | |
|---|---|---|---|---|
| 8,897,224 | B2 | 11/2014 | Ben-Eli | |
| 9,125,146 | B1 | 9/2015 | Edara et al. | |
| 9,420,523 | B2 | 8/2016 | Damji et al. | |
| 11,490,302 | B2 | 11/2022 | Matolia et al. | |
| 2022/0078733 | A1* | 3/2022 | Li | H04B 17/364 |
| 2022/0201425 | A1* | 6/2022 | Fraccaroli | G06F 16/284 |
| 2022/0394492 | A1* | 12/2022 | Chaugule | H04W 16/14 |

* cited by examiner

*Primary Examiner* — Muhammad N Edun
(74) *Attorney, Agent, or Firm* — Kipman T. Werking; Frontier IP Law PLLC

(57) ABSTRACT

A disclosed method may include receiving, by a server of a mobile operator, a location information message from a user equipment device that the user equipment device sent in response to the user equipment device powering on such that the location information message indicates a location of the user equipment device and matching, by the mobile operator, the location of the user equipment device that was indicated by the location information message sent by the user equipment device to a specific geofenced area from among a plurality of geofenced areas defined by the mobile operator.

20 Claims, 12 Drawing Sheets

CELLULAR COVERAGE ACQUISITION SYSTEMS AND METHODS

BRIEF SUMMARY

This disclosure is generally directed to systems, methods, and computer-readable media relating to cellular coverage acquisition. In modern cellular networks, the process of acquiring a network connection is a fundamental operation that user equipment devices, such as smartphones, perform regularly. This process typically occurs when a device is first powered on, when it moves out of coverage and needs to re-establish a connection, or when it transitions between different network types. Traditionally, this network acquisition process has involved a comprehensive scan of all available frequency bands and channels, a method commonly referred to as a full band scan. While thorough, this approach can be time-consuming and energy-intensive, potentially leading to delayed connections and increased battery drain for users.

The challenges associated with traditional full band scanning have become increasingly pronounced in the evolving landscape of cellular networks. As new generations of cellular technology are introduced and deployed alongside existing infrastructures, the number of potential frequency bands and channels that a device may need to scan has grown significantly. This expansion of the cellular spectrum, while beneficial for overall network capacity and performance, has exacerbated the inefficiencies inherent in the full band scanning approach. In some cases, devices may spend up to 90 seconds or more performing a full band scan, a duration that can feel frustratingly long for users attempting to establish a connection, particularly in areas with poor or inconsistent coverage.

The advent of 5G networks has further complicated the network acquisition process. Devices now must be capable of scanning across a wider range of frequency bands, including those used by legacy 2G, 3G, and 4G networks, as well as the new 5G bands. This increased complexity not only affects the time required for network acquisition but also impacts the power consumption of devices. The energy demands of repeatedly scanning across numerous frequency bands can contribute to faster battery depletion, a significant concern for users who rely on their devices throughout the day.

Another factor contributing to the inefficiency of traditional scanning methods is the lack of consideration for the specific spectrum holdings of mobile operators in different geographical areas. Mobile operators typically own or have access to specific portions of the radio frequency spectrum, and these holdings can vary significantly from one region to another. However, conventional scanning approaches often do not account for these variations, leading devices to waste time and energy scanning frequencies that may not be available or relevant in their current location.

The increasing prevalence of roaming agreements between mobile operators adds another layer of complexity to the network acquisition process. When a device is in a location where its home network is not available, it may need to connect to a partner network. This scenario often requires the device to perform scans for multiple network operators, potentially multiplying the time and energy costs associated with network acquisition. The traditional full band scanning approach may be particularly inefficient in these roaming situations, as it may not prioritize or optimize for the most likely available networks in a given area.

The rapid growth of Internet of Things (IoT) devices and machine-to-machine (M2M) communications has also highlighted the limitations of related network acquisition methods. Many IoT devices operate on limited power budgets and may need to connect to cellular networks intermittently. For these devices, an efficient and streamlined network acquisition process is crucial to conserve energy and extend battery life. The time and power demands of full band scanning can be particularly problematic for IoT applications, potentially limiting the deployment and effectiveness of these devices in various scenarios.

In response to these challenges, there is a growing need for more intelligent and efficient methods of network acquisition. One technique that can show promise is smart scanning, which aims to optimize the network acquisition process by leveraging additional information and context. Smart scanning techniques may involve selectively scanning only a subset of frequency bands and channels, prioritizing the most likely candidates based on various factors such as location, network operator information, and historical data.

The use of geolocation data in conjunction with network acquisition processes represents a potential avenue for improvement. By considering the device's current location, it may be possible to tailor the scanning process to focus on frequency bands and channels known to be available or commonly used in that specific area. This approach could potentially reduce the time and energy required for network acquisition by eliminating the need to scan frequencies that are unlikely to be relevant in the current location.

Another potential enhancement to the network acquisition process involves the use of dynamically updated configuration files. These files could contain specific information about which frequency bands and channels to scan, tailored to the device's current location and network environment. By regularly updating these configuration files based on changes in spectrum availability and network conditions, one can help maintain optimal scanning efficiency over time, even as the network landscape evolves.

For scenarios involving roaming or areas with multiple available networks, intelligent prioritization of network scans could offer significant improvements. By considering factors such as known roaming agreements, signal strength predictions, and historical connection success rates, devices may be able to more quickly identify and connect to the most suitable available network. This could potentially reduce the need for exhaustive scans across all possible networks, streamlining the acquisition process in complex network environments.

In some example, a method can include (i) receiving, by a server of a mobile operator, a location information message from a user equipment device that the user equipment device sent in response to a trigger event indicating a request to establish or re-establish a network connection such that the location information message indicates a location of the user equipment device, (ii) matching, by the mobile operator, the location of the user equipment device that was indicated by the location information message sent by the user equipment device to a specific geofenced area from among a plurality of geofenced areas defined by the mobile operator, and (iii) transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

In some examples, the method includes determining, by the mobile operator, the limited set of band and absolute radio frequency channel number targets based on spectrum holding information specific to the geofenced area.

In some examples, the method includes defining, by the mobile operator, the geofenced area such that the geofenced area corresponds to a Partial Economic Area as defined by the Federal Communications Commission.

In some examples, the method includes updating, by the mobile operator, the configuration file dynamically based on changes in spectrum availability in the geofenced area and transmitting, by the mobile operator, the updated configuration file to the user equipment device.

In some examples, the method includes transmitting, by the mobile operator, an update to the configuration file using a binary short message service message.

In some examples, the method includes the binary short message service message is formatted according to the Open Mobile Alliance Client Provisioning (OMA-CP) protocol.

In some examples, the method includes the binary short service message is sent to a specific configuration port on the user equipment device In some examples, the method includes defining, by the mobile operator, different configuration files for different geofenced regions based on different spectrum holdings in each of the different geofenced regions.

In some examples, the method includes updating, by the mobile operator, the configuration file when the user equipment device moves from one Partial Economic Area to another Partial Economic Area.

In some examples, the method includes including, by the mobile operator, band and absolute radio frequency channel number targets for multiple radio access technologies in the configuration file.

In some examples, the method includes creating, by the mobile operator, the configuration file as a thin file containing essentially only the band and absolute radio frequency channel number targets.

In some examples, the method includes specifying, by the mobile operator, in the configuration file a prioritized order for scanning the limited set of band and absolute radio frequency channel number targets.

In some examples, the method includes determining, by the mobile operator, the limited set of band and absolute radio frequency channel number targets based on spectrum holding information that includes data about which portions of bands are available to the mobile operator in the geofenced area.

In some examples, the method includes detecting, by the mobile operator, that the user equipment device has moved to a new geofenced area and transmitting, by the mobile operator, a new configuration file corresponding to the new geofenced area to the user equipment device.

In some examples, the trigger event comprises at least one of device power-on, loss of network connection, recovery from airplane mode, switching between networks, a periodic network scan in idle mode, or a user-initiated network search.

In some examples, the method includes storing the configuration file in an embedded file system of a modem in the user equipment device and configuring the user equipment device to process the configuration file before executing chipset vendor-specific scanning algorithms.

In some examples, a non-transitory computer-readable medium has instructions stored thereon that, when executed by at least one physical computing processor, cause a computing device to perform operations comprising: (i) receiving, by a server of a mobile operator, a location information message from a user equipment device that the user equipment device sent in response to the user equipment device powering on such that the location information message indicates a location of the user equipment device, (ii) matching, by the mobile operator, the location of the user equipment device that was indicated by the location information message sent by the user equipment device to a specific geofenced area from among a plurality of geofenced areas defined by the mobile operator, and (iii) transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

In some examples, a system comprises at least one physical computing processor of a computing device and a non-transitory computer-readable medium that has instructions stored thereon that, when executed by the at least one physical computing processor, cause the computing device to perform operations comprising: (i) receiving, by a server of a mobile operator, a location information message from a user equipment device that the user equipment device sent in response to the user equipment device powering on such that the location information message indicates a location of the user equipment device, (ii) matching, by the mobile operator, the location of the user equipment device that was indicated by the location information message sent by the user equipment device to a specific geofenced area from among a plurality of geofenced areas defined by the mobile operator, and (iii) transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
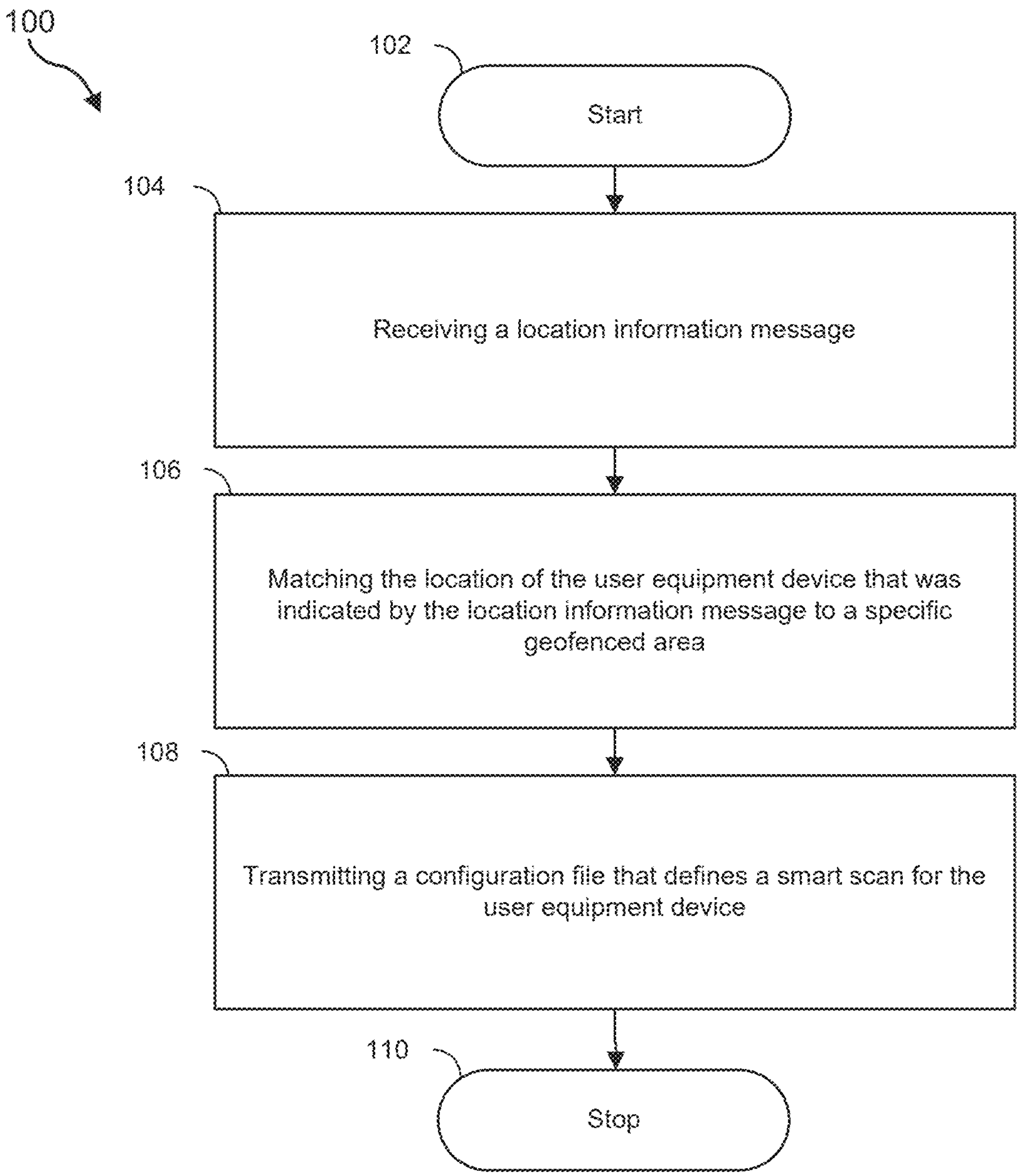
FIG. 1 shows a flow diagram for a method relating to roaming optimization.

FIG. 1 shows a flow diagram for a method 100 relating to cellular coverage acquisition. At step 101, method 100 may start. At step 102, method 100 includes receiving, by a server of a mobile operator, a location information message from a user equipment device that the user equipment device sent in response to the user equipment device powering on such that the location information message indicates a location of the user equipment device. At step 104, method 100 includes matching, by the mobile operator, the location of the user equipment device that was indicated by the location information message sent by the user equipment device to a specific geofenced area from among a plurality of geofenced areas defined by the mobile operator. At step 102, method 100 includes (iii) transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan. At step 108, method 100 ends.

Figure 2:
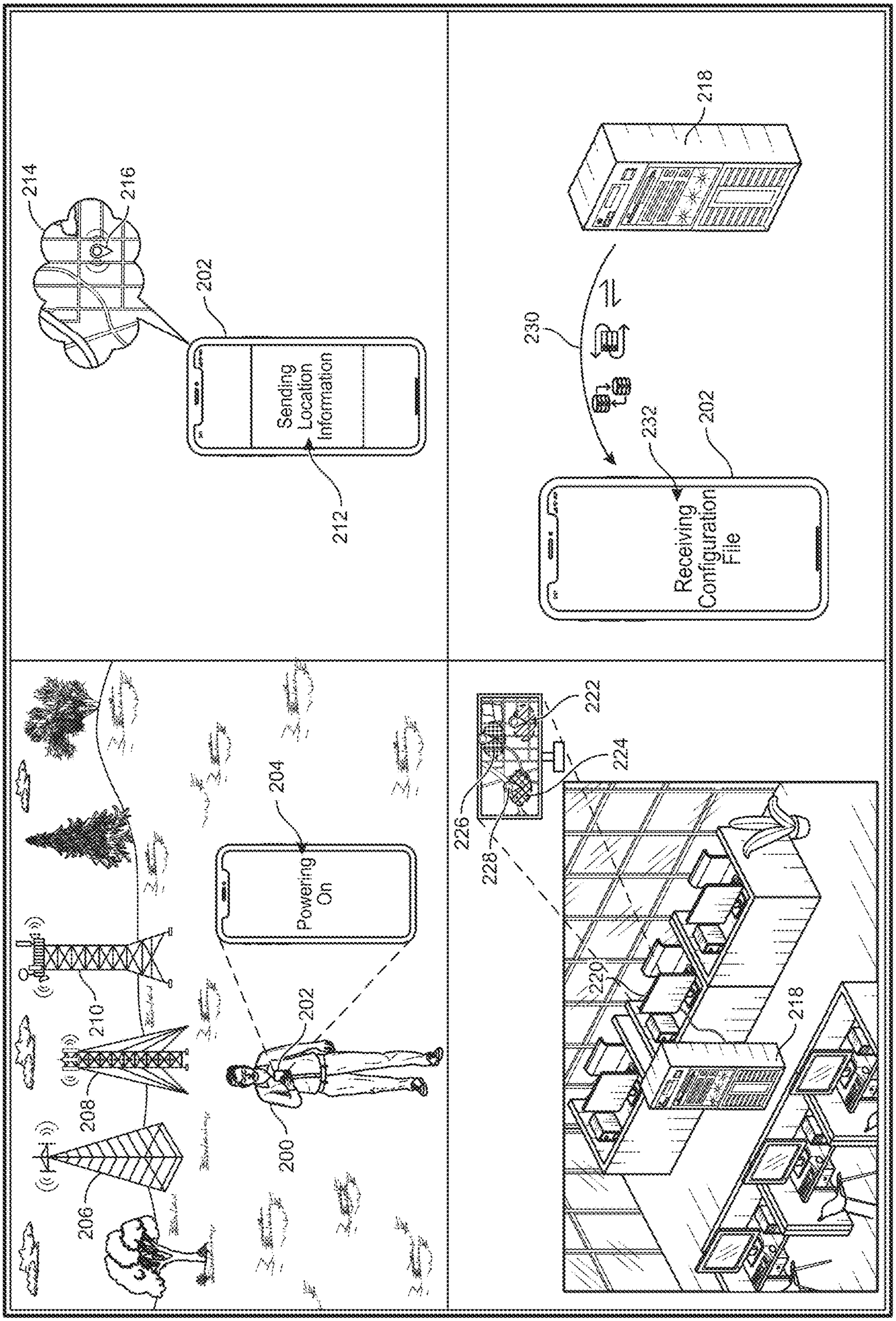
FIG. 2 illustrates a multi-panel representation of the process for initiating a smart scan in a cellular network environment.

FIG. 2 illustrates a multi-panel representation of the process for initiating a smart scan in a cellular network environment. Throughout this figure, certain messages may be displayed, such as "powering on" and "receiving configuration file." These messages and other graphical user interface indicators may be included within this disclosure for illustrative purposes to help visualize the various inventive concepts of the corresponding technological embodiments. Nevertheless, in practical scenarios one or more of these messages or graphical user interface indicators may be omitted, hidden, or performed in the background, as understood by those having skill in the art. Accordingly, the messages and graphical user interface indicators are included for the purposes of visualizing and helping to explain various inventive concepts without necessarily indicating, or suggesting, that any of these would be naturally or implicitly included within practical real-world embodiments.

The figure is divided into four panels, each depicting a step that can be included in the process of a user equipment device connecting to a mobile operator's network using the smart scan technique. In the first panel, a user 200 is shown activating a smartphone 202. The smartphone's screen displays a "Powering On" message 204, indicating the initial stage of the device boot-up process. This step represents a trigger event indicating a need to establish or re-establish a network connection, which initiates the smart scan process. In the background, multiple cell towers 206, 208, and 210 are visible, symbolizing the presence of different mobile operators in the area. These towers represent the potential network options available to the user equipment device. The presence of multiple towers highlights the challenge faced by traditional scanning methods, which may need to search through all available networks, potentially leading to longer connection times and increased power consumption. This scenario sets the stage for demonstrating the advantages of the smart scan technique introduced in this disclosure.

The second panel of FIG. 2 focuses on the smartphone screen 202, which now displays a "Sending Location Information" message 212. This message indicates that the user equipment device is transmitting a location information message to the server of the mobile operator in response to the trigger event. Above the phone, a thought bubble 214 containing a map pin icon 216 is shown, visually representing the location information being sent. This step is crucial for the smart scan process, as it allows the mobile operator to match the location of the user equipment device indicated by the location information message to a specific geofenced area from among a plurality of geofenced areas defined by the mobile operator. The location information message includes data indicating the current location of the user equipment device. This location data can be derived from various sources, such as GPS information, the last known location stored in the device, information from a current connection to a known Wi-Fi location, or device sensor information (e.g., proximity sensor, gyroscope) to determine if the device has moved since a previous successful network registration.

In the third panel of FIG. 2, the interior of a mobile operator's server room is depicted. A server 218 is shown receiving the location information sent by the user equipment device. Connected to the server, a monitor 220 displays a map with multiple geofenced areas 222, 224, and 226. These geofenced areas may correspond to Partial Economic Areas (PEAs) as defined by the Federal Communications Commission (FCC). The use of PEAs for geofencing can allow for efficient spectrum allocation and management, as spectrum holdings may vary across different PEAs. On the monitor, a blinking dot 228 represents the user's location within one of these geofenced areas. This visualization illustrates how the mobile operator's system processes the received location information to determine the appropriate geofenced area for the user equipment device.

The fourth panel of FIG. 2 shows a split screen, with the smartphone 202 on one side and the server 218 on the other. An arrow 230 is shown moving from the server to the phone, representing the transmission of a configuration file from the server of the mobile operator to the user equipment device in response to receiving the location information message. This configuration file defines a smart scan for the user equipment device by specifying a limited set of band and channel number targets that the mobile operator has assigned to the geofenced area. These targets are determined based on the mobile operator confirming that the limited set of band and channel number targets are available to the user equipment device through the mobile operator in the geofenced area. On the phone's screen, a "Receiving Configuration File" message 232 is displayed, indicating that the device is obtaining the necessary information to perform the smart scan. The configuration file enables the user equipment device to perform the smart scan, which may improve network acquisition time by selectively limiting the scan to the specific set of band and channel number pairs defined in the file. This approach allows the user equipment device to bypass a full band scan, potentially reducing the time required for network acquisition from the traditional 90 seconds or more to around 5 seconds.

FIG. 2 illustrates the process of a user equipment device sending location information to a mobile operator's server upon powering on, and the server responding with a configuration file based on the device's location within a specific geofenced area. This process forms the foundation of the smart scan technique, which can optimize the network acquisition process by tailoring the scan parameters to the specific spectrum holdings and network conditions in the user's location. By leveraging geofencing and up-to-date spectrum holding information, the smart scan technique may offer significant improvements in connection speed and efficiency compared to traditional full band scanning methods. The configuration file may be dynamically updated based on changes in spectrum availability in the geofenced area, and these updates can be transmitted using binary short message service messages. The smart scan process can be implemented for both non-standalone operations of a first radio access technology in cooperation with a second radio access technology, as well as for standalone operations of a radio access technology.

Figure 3:
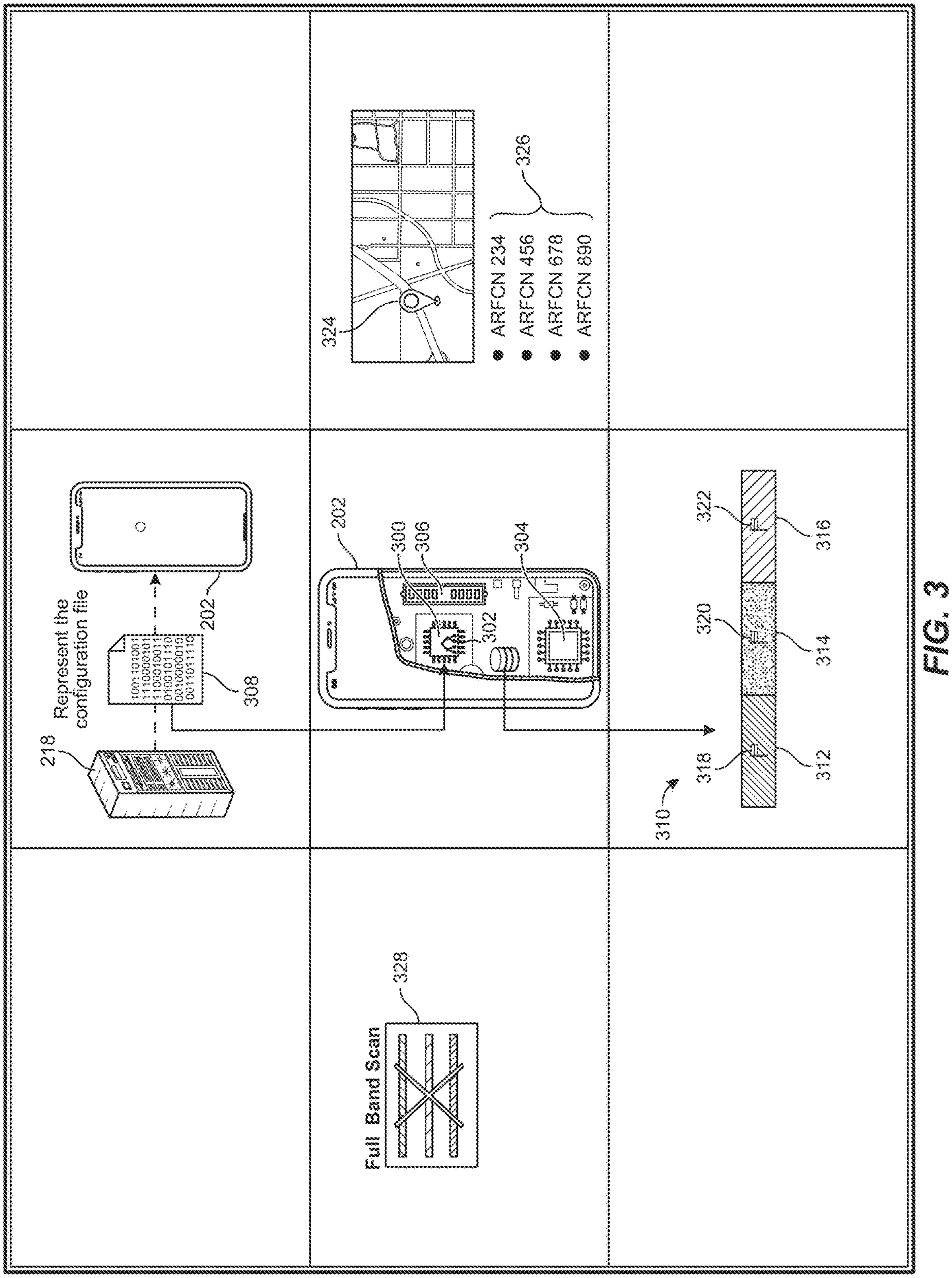
FIG. 3 presents a detailed technical illustration of the components and processes involved in the smart scan technique.

FIG. 3 presents a detailed technical illustration of the components and processes involved in the smart scan technique. The figure depicts a comprehensive view of how the configuration file enables the smart scan by providing a limited set of band and channel number pairs specific to the geofenced area, allowing the user equipment device to bypass a full band scan. At the center of FIG. 3, a smartphone 202 is shown with its internal components visible, providing insight into the hardware elements that facilitate the smart scan process. Within the smartphone, a modem 300 is prominently displayed. This modem plays a crucial role in the smart scan process, as it contains the embedded file system 302 where the configuration file is stored. The embedded file system 302 is depicted as a storage icon within the modem, illustrating how the configuration file is integrated into the device's hardware architecture. Adjacent to the modem, the figure shows a processor 304 and memory 306, which are components for executing the smart scan algorithm and managing the device's network connection processes.

At the top of FIG. 3, the mobile operator's server 218 is depicted sending the configuration file 308 to the smartphone. This visual representation aligns with the claim language describing the transmission of the configuration file from the server of the mobile operator to the user equipment device. The configuration file 308 is represented as a document icon with binary code visible, emphasizing its digital nature and the fact that it contains specific instructions for the smart scan process. The bottom portion of FIG. 3 features a spectrum diagram 310, which visually represents the frequency bands available for cellular communication. This diagram is divided into multiple sections, each representing a distinct frequency band (312, 314, 316). Within each band, specific points or small ranges are highlighted, representing the Absolute Radio Frequency Channel Numbers (ARFCNs) or E-UTRA Absolute Radio Frequency Channel Numbers (EARFCNs) that are targets for the smart scan. These highlighted points (318, 320, 322) correspond to the limited set of band and channel number targets specified in the configuration file, which may be licensed by an operator in that designated PEA.

On the right side of FIG. 3, a simplified map representing the geofenced area 324 where the phone is located is shown. Adjacent to this map, a list of the limited set of band and ARFCN targets 326 associated with this area is displayed. This visual element helps illustrate how the configuration file can specify a limited set of band and channel number targets that the mobile operator has assigned to the geofenced area. The juxtaposition of the geofenced area map and the list of targets illustrates how the smart scan process is tailored to specific geographic locations. On the left side of FIG. 3, a representation of a full band scan 328 is shown crossed out. This visual cue emphasizes a benefit of the smart scan technique: the ability to bypass a full band scan. By avoiding the need to scan all possible frequencies, the smart scan can significantly reduce the time and power required for network acquisition. Arrows in FIG. 3 illustrate the flow of information from the server to the smartphone, and from the configuration file to the modem's embedded file system. These arrows visually represent how the smart scan process is initiated and executed within the device. The figure also shows how the specific targets from the configuration file are applied to the spectrum diagram, highlighting the selective nature of the smart scan.

FIG. 3 effectively illustrates how the smart scan technique leverages specific hardware components and tailored configuration data to optimize the network acquisition process. By storing the configuration file in the modem's embedded file system and using it to target specific frequency ranges, the user equipment device can potentially achieve faster and more efficient network connections. This approach aligns with the goal of reducing network acquisition time from 90 seconds or more to approximately 5 seconds. The detailed nature of FIG. 3 also allows for the illustration of several related concepts. For instance, the figure shows how the configuration file can include band and channel number targets (e.g., targets for acquisition) for multiple radio access technologies, as the spectrum diagram can represent frequencies used by various generations of cellular technology (e.g., 5G, 4G, 3G, 2G). The visual representation of the configuration file being sent from the server to the device also supports the concept of dynamically updating the configuration file based on changes in spectrum availability in the geofenced area. Furthermore, FIG. 3 illustrates how the limited set of band and channel number pairs can be determined based on spectrum holding information specific to the geofenced area. The connection between the geofenced area map and the list of specific targets implies that these targets are chosen based on the mobile operator's spectrum holdings in that particular area.

Figure 4:
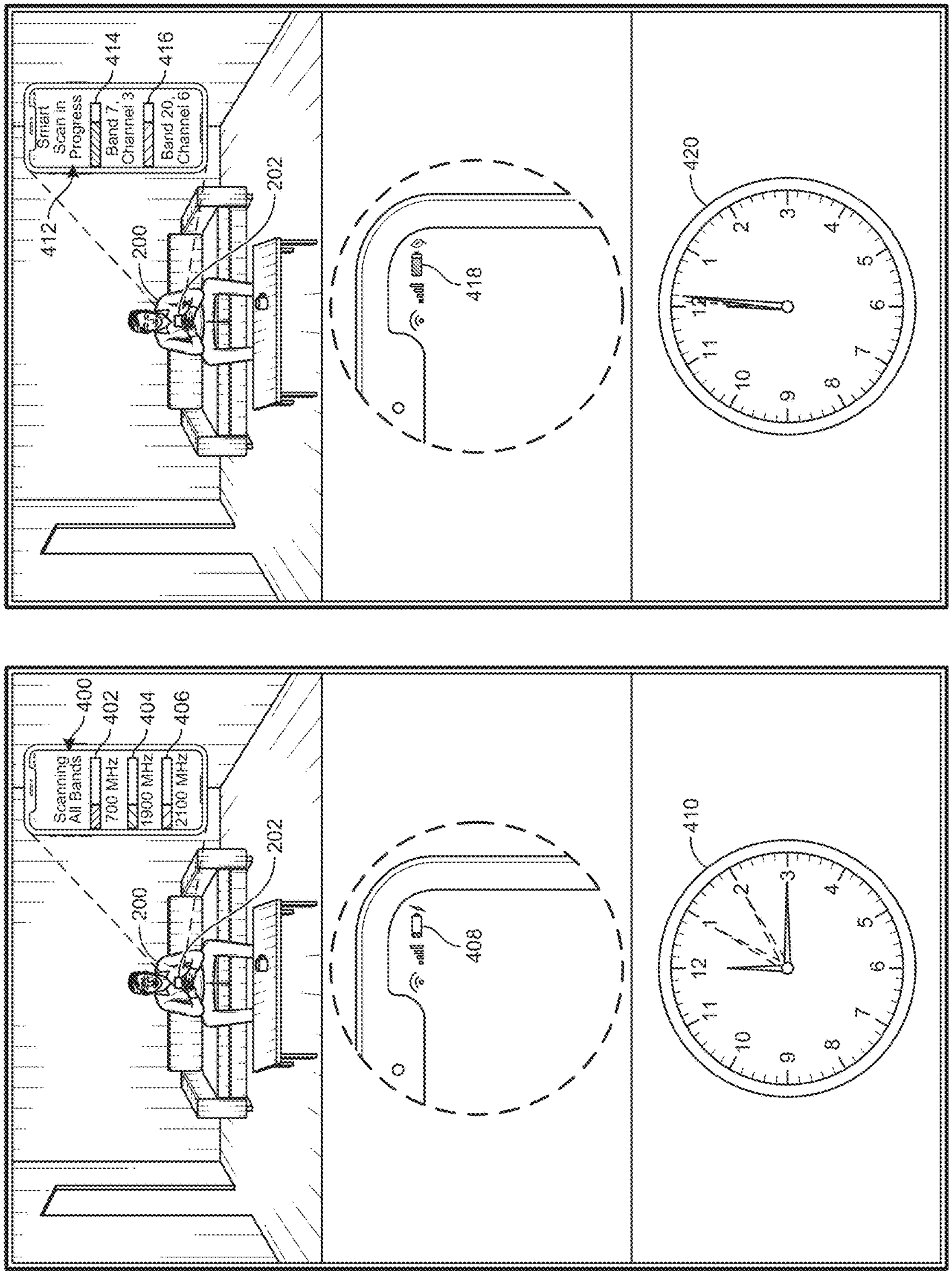
FIG. 4 provides a comparative illustration demonstrating the advantages of the smart scan technique over traditional full band scanning methods.

FIG. 4 presents a comparative illustration that effectively demonstrates the advantages of the smart scan technique over traditional full band scanning methods. The figure is divided into two main sections, with the left side depicting the related method of network acquisition and the right side showcasing the smart scan approach. This side-by-side comparison allows for a clear visualization of the improvements offered by the smart scan technique in terms of time efficiency and power consumption.

On the left side of FIG. 4, representing the old method, a user 200 is shown looking frustrated as their smartphone 202 displays a "Scanning All Bands" message 400. This visual cue conveys the time-consuming nature of the traditional full band scan process. Below the message, multiple progress bars 402, 404, and 406 are displayed, each representing different frequency bands being scanned. The presence of numerous, slowly advancing progress bars reinforces the idea that the traditional method involves searching through a wide range of frequencies, which can be a lengthy process. This comprehensive scanning approach, while thorough, often results in longer connection times and increased power consumption, leading to user frustration and potentially missed communication opportunities.

Continuing with the left side of FIG. 4, a battery icon 408 on the phone is depicted as nearly empty, visually representing the high power consumption associated with the full band scanning process. This element of the illustration effectively communicates one of the drawbacks of the traditional method, which is its significant drain on the device's battery life. Adjacent to the battery icon, a clock 410 shows that a considerable amount of time has passed during the scanning process. The combination of the depleted battery and the elapsed time on the clock serves to emphasize the inefficiencies inherent in the full band scanning approach, highlighting the goal of a more optimized solution.

In contrast, the right side of FIG. 4 illustrates the new smart scan method, showcasing its benefits in terms of speed and energy efficiency. Here, the same user 200 is depicted, but this time with a relaxed expression, indicating a more positive user experience. The smartphone 202 now displays a "Smart Scan in Progress" message 412, immediately distinguishing this process from the related method. Below this message, fewer and faster-moving progress bars 414 and 416 are shown. The reduced number and increased speed of these progress bars visually represent the smart scan's ability to focus on a limited set of band and channel number pairs, as specified in the configuration file transmitted by the mobile operator's server. This targeted approach allows for a more efficient scanning process, potentially reducing the time required for network acquisition from around 90 seconds or more to around 5 seconds.

The right side of FIG. 4 also includes a battery icon 418 on the phone, but in this case, it is shown as mostly full. This visual element effectively communicates the reduced power consumption associated with the smart scan technique. By limiting the scan to specific frequency ranges determined to be available and relevant based on the device's location and the mobile operator's spectrum holdings, the smart scan method can significantly reduce the energy requirements of the network acquisition process. Adjacent to the battery icon, a clock 420 displays a minimal amount of time passed, further emphasizing the speed improvements offered by the smart scan technique. The juxtaposition of the full battery and the minimal time elapsed provides a clear visual representation of the dual benefits of the smart scan approach: faster connection times and improved energy efficiency.

Figure 5:
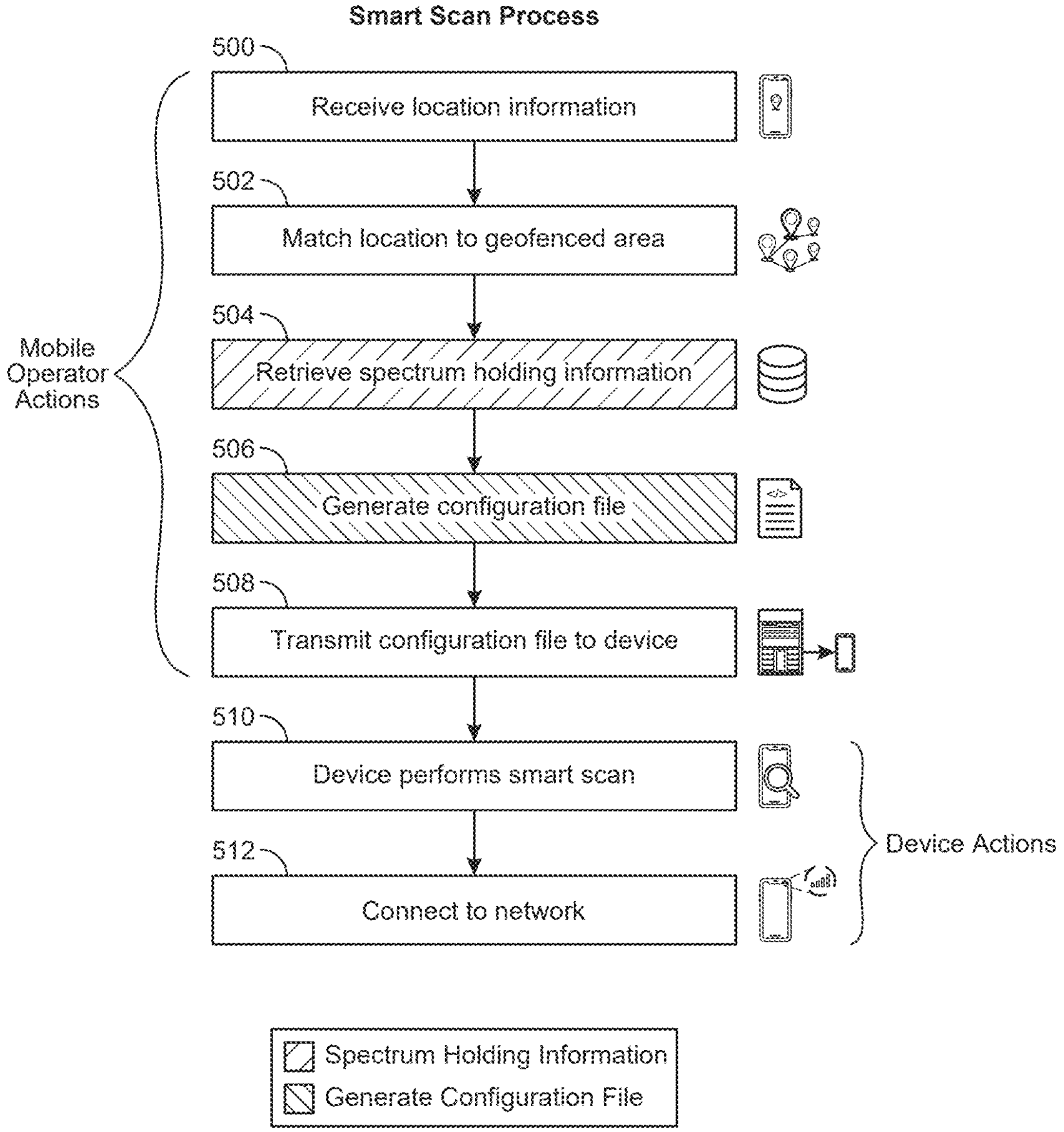
FIG. 5 displays a technical flowchart illustrating the step-by-step process of the smart scan technique.

FIG. 5 presents a technical flowchart that illustrates the step-by-step process of the smart scan technique. This flowchart provides a clear, visual representation of stages that can be involved in optimizing network acquisition using the methods described in this disclosure. The figure is composed of several rectangular boxes, each representing a distinct step in the process, connected by arrows that indicate the flow of operations. At the top of the flowchart, the first step is labeled "Receive location information" (500). This step corresponds to the initial action described in the claims, where the server of the mobile operator receives a location information message from the user equipment device. This message is sent in response to a trigger event, such as the device powering on or experiencing a loss of network connection. The location information provides data that allows the mobile operator to tailor the smart scan process to the specific geographic area where the device is located. Following the receipt of location information, the next step in the flowchart is "Match location to geofenced area" (502). This step represents the mobile operator's action of correlating the received location data with predefined geofenced areas. These geofenced areas may correspond to Partial Economic Areas (PEAs) as defined by the Federal Communications Commission (FCC). By matching the device's location to a specific geofenced area, the mobile operator can determine which spectrum holdings and network resources are relevant for that particular location.

The third step in the flowchart is "Retrieve spectrum holding information" (504). This step illustrates the process of accessing the mobile operator's database of spectrum holdings for the identified geofenced area. The spectrum holding information includes data about which portions of various frequency bands are owned or accessible by the mobile operator in that specific geographic region. This information is helpful for determining an efficient set of frequencies for the device to scan. Next, the flowchart shows the step "Generate configuration file" (506). This step represents the creation of the tailored configuration file that defines the smart scan parameters for the user equipment device. The configuration file specifies a limited set of band and channel number targets that the mobile operator has assigned to the geofenced area. These pairs are determined based on the spectrum holding information retrieved in the previous step, ensuring that the device will only scan frequencies that are actually available and relevant in its current location. Furthermore, this configuration file allows the mobile operator to tailor a precious set of frequencies based on device type and its use-cases, allowing the operator to load-balance devices in the spectrum or even changing the band scan priority. For example, for a sensor or IoT type devices, which do not require high throughput but require higher range, the operator can select frequencies in the low-band 402 or 404; while for a tablet or hotspot type devices, which require higher throughput, the operator can select frequencies in the mid-band 406. With this configuration file the operator can also reorder the priority of the frequency bands allowing the user equipment to scan a set of frequencies prior to another one or more sets of frequencies. For example, based on the location provided by the user equipment device, if the device is in an indoor environment, where the operator has deployed indoor femto cells inside the building operating at frequency 406 and outdoor macro cells operating at frequencies 402 and 404, then by changing the order of the frequencies in the configuration file from 402, 404, 406 to 406, 404, 402, the device will prioritize camping on the indoor femto cell first over the outdoor macro cell. The fifth step in the flowchart is "Transmit configuration file to device" (508). This step corresponds to the action of the mobile operator's server sending the generated configuration file to the user equipment device. The transmission of this file enables the device to perform a targeted, efficient scan rather than a full band scan. This step is helpful for implementing the smart scan technique and potentially reducing network acquisition time significantly.

The next step shown in the flowchart is "Device performs smart scan" (510). While this step is carried out by the user equipment device rather than the mobile operator, it is included in the flowchart to provide a complete picture of the process. During this step, the device utilizes the received configuration file to perform a scan limited to the specified band and channel number targets, and this process can be performed while following the exact order specified in the file. This targeted approach allows the device to bypass a full band scan, potentially reducing the time and power required for network acquisition. The final step in the flowchart is "Connect to network" (512). This step represents the successful outcome of the smart scan process, where the user equipment device establishes a connection with the mobile operator's network. By leveraging the optimized scanning parameters provided in the configuration file, this connection can potentially be established more quickly and efficiently than with related scanning methods. FIG. 5 also includes additional visual elements that enhance its informational value. On the left side of the flowchart, a vertical bar labeled "Mobile Operator Actions" spans steps 1-5, clearly delineating which parts of the process are carried out by the mobile operator's systems. On the right side, another vertical bar labeled "Device Actions" spans steps 6-7, indicating the portions of the process performed by the user equipment device. This clear separation of responsibilities helps to illustrate the collaborative nature of the smart scan technique, showing how actions by both the mobile operator and the device contribute to the optimized network acquisition process.

Figure 6:
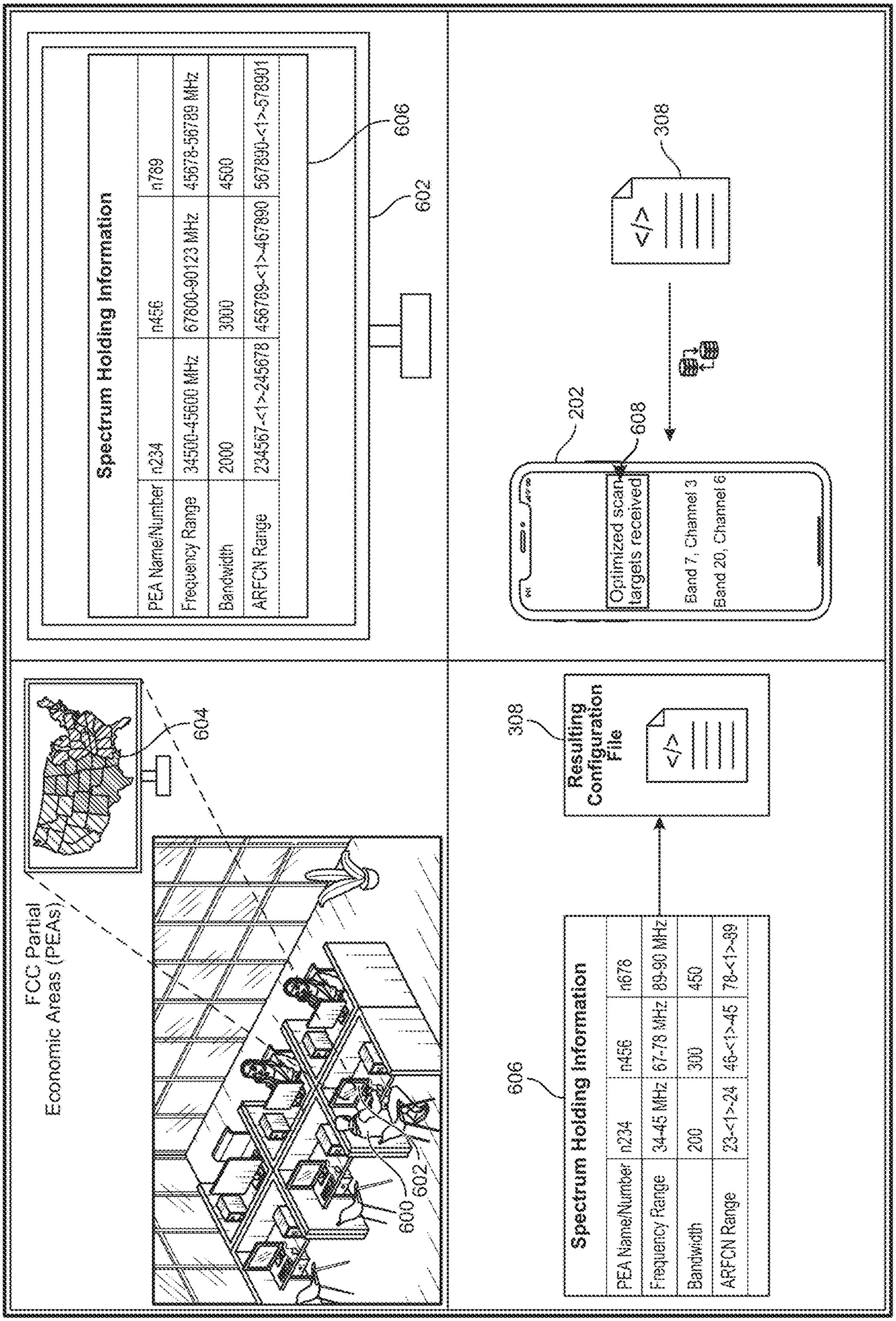
FIG. 6 presents a multi-panel illustration focusing on the role of spectrum holding information in the smart scan process.

FIG. 6 presents a multi-panel illustration that focuses on the role of spectrum holding information in the smart scan process. This figure can help to visualize how the mobile operator may utilize specific spectrum data to create optimized configuration files for smart scanning. The figure is divided into four panels, each depicting a different potential aspect of the process.

In the first panel of FIG. 6, an interior view of a mobile operator's office is shown. An employee 600 can be seen working at a computer 602. The computer screen displays a map of Partial Economic Areas (PEAs) 604 as defined by the Federal Communications Commission (FCC). This map may cover the entire United States. The inclusion of PEAs in this illustration aligns with the concept that geofenced areas used in the smart scan process may correspond to these FCC-defined regions. Along with spectrum holdings 602, employee 600 may also have information about the cell sites that are deployed by the mobile operator and that are radiating the corresponding frequency. This approach can allow for efficient spectrum allocation and management, as spectrum holdings may vary across different PEAs. Moreover, the corresponding site deployment information (e.g., site deployed and radiating, site deployed but not radiating, site out of service, and planned for deployment) allows the operator to dynamically change the set of valid frequencies in that particular geofenced location. The employee's interaction with this map can represent the process of managing and analyzing spectrum holdings across various geographical areas, which can be a helpful component in implementing the smart scan technique effectively.

The second panel of FIG. 6 provides a closer look at the computer screen 602, now showing detailed spectrum holding information 606 for a specific PEA. This information may be presented in a tabular format, potentially including columns for PEA Name/Number, Frequency Range, Bandwidth, ARFCN (Absolute Radio Frequency Channel Number) Range, and site deployment information. The inclusion of multiple rows in this table can illustrate the complexity and variety of spectrum holdings that a mobile operator may have in a single geographic area. This detailed view can help to visualize how the mobile operator may determine the specific band and channel number targets to include in the configuration file for a given geofenced area. The spectrum holding information displayed here can be a key input in the process of generating tailored configuration files that enable user equipment devices to perform efficient, targeted scans.

In the third panel of FIG. 6, a split-screen design is employed to illustrate the process of translating spectrum holding information into a configuration file. On one side, a simplified version of the spectrum holding information 606 from the previous panel is shown. On the other side, the resulting configuration file 308 is displayed. This configuration file may be represented as a document with structured data, potentially in a structured, markup language, and/or data interchange format such as JSON or XML. This panel can effectively illustrate the step in the smart scan process where the mobile operator generates a configuration file based on the spectrum holding information for a specific geofenced area.

The fourth panel of FIG. 6 shows a smartphone 202 receiving the configuration file 308. The file is depicted as a small icon moving towards the phone, representing the transmission of the file from the mobile operator's server to the user equipment device. On the phone's screen, a message reading "Optimized scan targets received" 608 is displayed. Below this message, a list of specific targets (e.g., "Band 7, Channel 3", "Band 20, Channel 6") is shown to illustrate the kind of information contained in the configuration file. This panel helps to visualize a potential final step in the process of providing smart scan parameters to the user equipment device, setting the stage for the device to perform an optimized, targeted scan.

Figure 7:
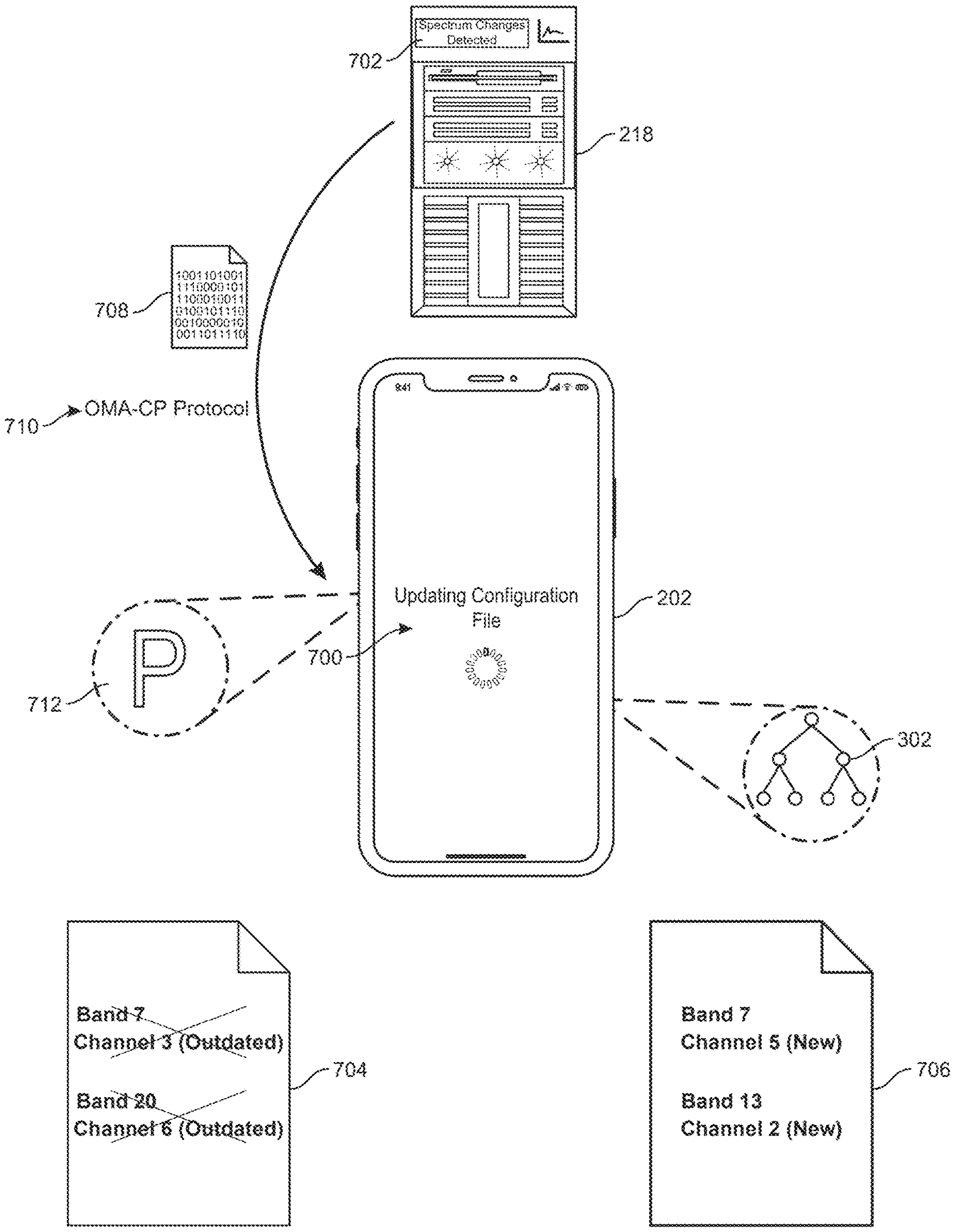
FIG. 7 shows a detailed technical illustration of the configuration file update process.

FIG. 7 presents a detailed technical illustration of the configuration file update process, highlighting how the smart scan parameters can be dynamically adjusted based on changes in spectrum availability. This figure can help to visualize the process of updating and transmitting new configuration files to user equipment devices, which may allow for real-time optimization of the network acquisition process.

At the top of FIG. 7, a representation of the mobile operator's server 218 is shown. On the server, a prominent alert message saying "Spectrum Changes Detected" 702 is displayed. This element of the figure can illustrate how the mobile operator's system may continuously monitor spectrum availability and identify when changes occur that could affect the efficiency of the smart scan process. In the center of FIG. 7, a large smartphone 202 is depicted. On the phone's screen, a message stating "Updating Configuration File" 700 is prominently displayed. This message is accompanied by a circular loading icon to indicate an ongoing process. This central element of the figure can represent the user equipment device's role in the update process, showing how it may receive and apply new smart scan parameters in real-time. The inclusion of this step in the figure can help to illustrate how the smart scan technique may adapt to changing network conditions, potentially maintaining optimal performance even as spectrum availability shifts.

In the bottom-left section of FIG. 7, a representation of the old configuration file 704 is shown. This is shown as a document icon with some visible content. The use of faded or crossed-out text helps to indicate that this information is outdated. Example entries in this old file might include "Band 7, Channel 3 (outdated)" and "Band 20, Channel 6 (outdated)". This part of the figure can serve to illustrate the need for updates to the configuration file as spectrum availability changes, showing how previously optimal scanning parameters may become less effective over time.

Adjacent to the old file, in the bottom-right section, the new configuration file 706 is depicted. This new file appears in bold, emphasizing its updated status. It includes new entries with updated information, such as "Band 7, Channel 5 (new)" and "Band 13, Channel 2 (new)". The contrast between the old and new files can help to visualize how the smart scan parameters may be adjusted to reflect changes in spectrum availability, potentially allowing for continued optimization of the network acquisition process.

A large, curved arrow is drawn from the server to the phone, representing the transmission of the update. Along this arrow, elements may be included to illustrate the specifics of the update process. A symbol representing a binary SMS message 708 is shown, indicating the method of transmission for the update. An icon or label for the OMA-CP (Open Mobile Alliance Client Provisioning) protocol 710 is also included, highlighting one illustrative example of a standard used for over-the-air device management and configuration. On the phone itself, the specific configuration port 712 where the update is sent through is figuratively highlighted. These elements can help to provide a detailed view of how the configuration file updates may be transmitted and received, supporting the claim language regarding the use of binary short message service messages for updates.

Smaller arrows can be used to show the old file being replaced by the new file within the phone's embedded file system 302, which should be visible inside the phone. This can help to illustrate how the update process may work at the device level, showing how new scanning parameters may be integrated into the user equipment device's systems.

Figure 8:
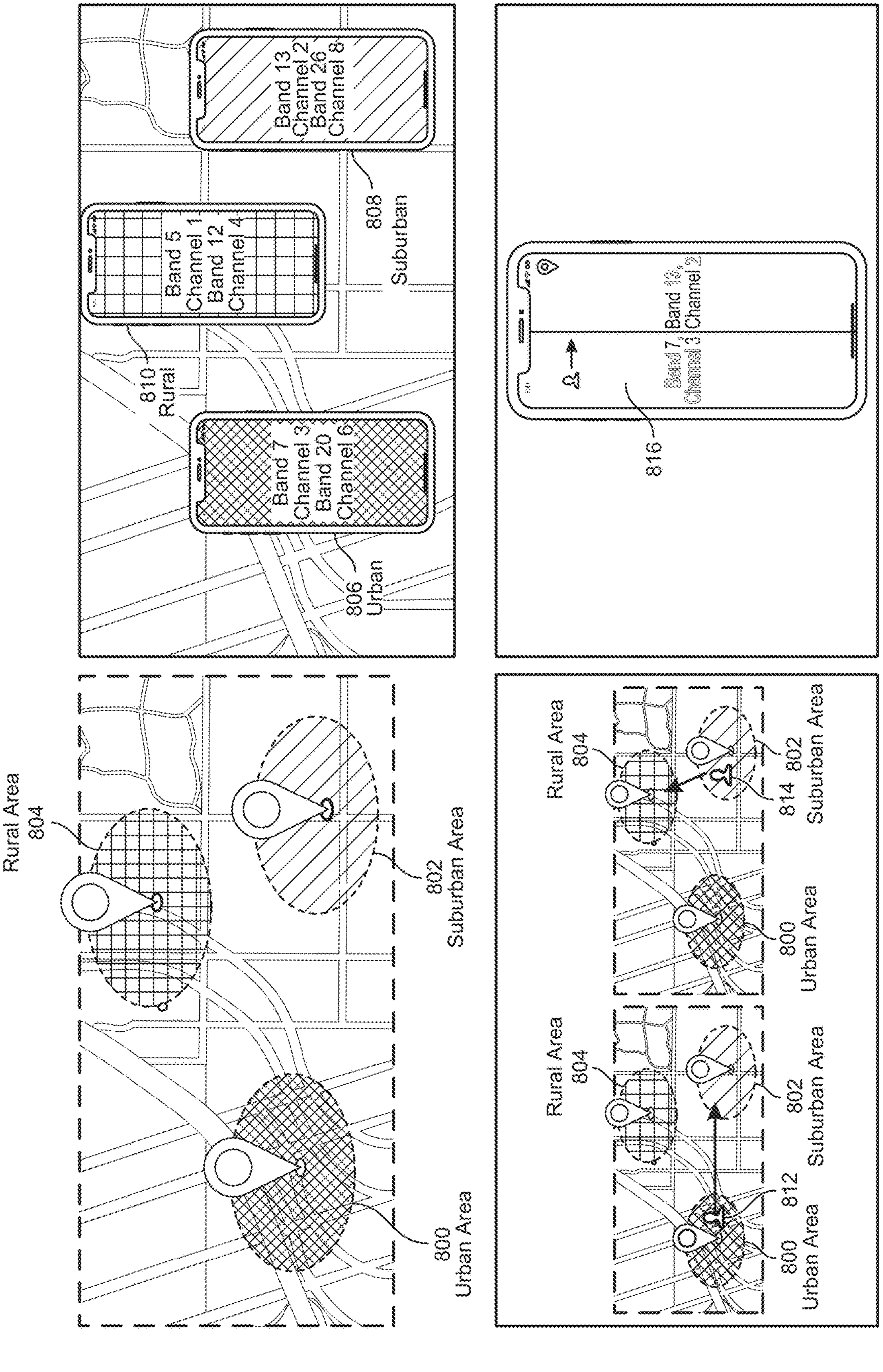
FIG. 8 illustrates a multi-panel representation showcasing the regional differences in smart scan configurations and how they adapt as users move between different geofenced areas.

FIG. 8 presents a multi-panel illustration that showcases the regional differences in smart scan configurations and how they adapt as users move between different geofenced areas. This figure can help to visualize the dynamic nature of various embodiments of the smart scan technique and its ability to optimize network acquisition across various geographical locations. The first panel of FIG. 8 displays a map showing multiple geofenced areas (800, 802, 804) corresponding to different Partial Economic Areas (PEAs). These areas are patterned distinctly to emphasize their boundaries. Labels such as "Urban Area 800", "Suburban Area 802", and "Rural Area 804" can be used to differentiate the regions. This panel can effectively illustrate how the mobile operator may divide its network coverage into distinct geofenced areas, potentially based on PEAs as defined by the Federal Communications Commission (FCC). This approach may allow for more granular and efficient spectrum management across diverse geographical regions.

In the second panel, three smartphones (806, 808, 810) are depicted, each positioned in a different geofenced area from the first panel. The screen of each phone displays a unique set of scan targets, reflecting the specific spectrum holdings and network conditions of its location. For example, the phone in the urban area 806 shows "Band 7, Ch. 3; Band 20, Ch. 6", while the phone in the suburban area 808 displays "Band 13, Ch. 2; Band 26, Ch. 8", and the rural phone 810 lists "Band 5, Ch. 1; Band 12, Ch. 4". This panel can help to illustrate how the configuration files may vary between regions based on different spectrum holdings in each geofenced area.

The third panel of FIG. 8 may employ a split-screen approach to show two users (812, 814) moving from one geofenced area to another. Arrows can be used to indicate their movement. For instance, User 812 might be shown moving from the Urban Area to the Suburban Area, while User 814 moves from the Suburban Area to the Rural Area. This panel can help to visualize the scenario where a user equipment device moves to a new geofenced area, triggering the need for an updated configuration file.

In the fourth panel, a close-up of a phone screen (816) is shown, illustrating the transition between old and new scan targets as the user crosses a PEA boundary. For illustrative purposes, this is shown as a split screen on the phone itself: on one side, the old targets are shown fading out (e.g., "Band 7, Ch. 3" becoming transparent), while on the other side, new targets fade in (e.g., "Band 13, Ch. 2" becoming opaque). A small map icon in the corner of the phone screen helps to indicate the user's position crossing from one area to another, reinforcing the connection between location and scan parameters. This panel can effectively demonstrate how the mobile operator may update the configuration file when the user equipment device moves from one Partial Economic Area to another.

Figure 9:
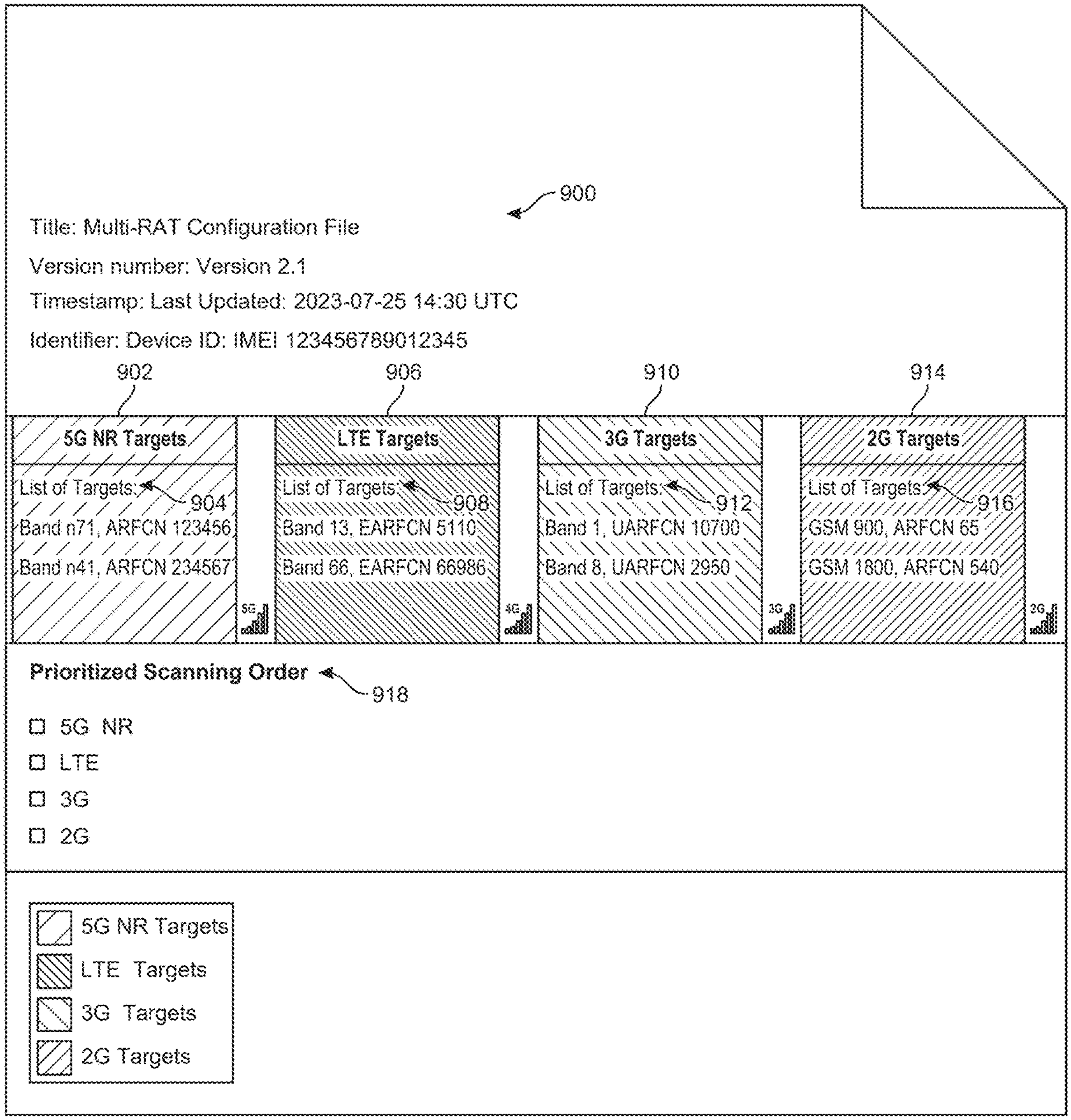
FIG. 9 presents a detailed technical illustration of a multi-RAT (Radio Access Technology) configuration file.

FIG. 9 presents a detailed technical illustration of a multi-RAT (Radio Access Technology) configuration file, showcasing how a single file can support optimized scanning across different network types. This figure can help to visualize the structure and content of the configuration file that enables the smart scan technique to work efficiently across various generations of cellular technology.

At the top of FIG. 9, a configuration file header 900 is prominently displayed. This header may include several pieces of information:

A title: "Multi-RAT Configuration File"

A version number: "Version 2.1"

A timestamp: "Last Updated: 2023-07-25 14:30 UTC"

An identifier: "Device ID: IMEI 123456789012345"

These elements can help to illustrate how the configuration file may be uniquely tailored to a specific device and kept up-to-date with the latest network information.

The main body of FIG. 9 is divided into four distinct sections, each representing a different radio access technology. This structure can demonstrate how a single configuration file may contain scanning parameters for multiple network types, allowing for comprehensive and efficient network acquisition across various technologies.

The 5G NR (New Radio) section 902 is presented first, reflecting the priority often given to the latest network technology. This section may include a list of targets 904 specific to 5G, such as:

"band N71, Arfcn 123456"

"Band n41, ARFCN 234567"

A small 5G icon is placed next to this section for quick visual identification.

Following the 5G section, an LTE (Long-Term Evolution) section 906 is shown. This section may include a list of targets 908 specific to 4G technology, for example:

"Band 13, EARFCN 5110"

"Band 66, EARFCN 66986"

A 4G icon is placed next to this section for consistency in visual identification.

The third section represents 3G technology 910, which may still be relevant in certain areas or for certain devices. This section can include a list of targets 912 specific to 3G, such as:

"Band 1, UARFCN 10700"

"Band 8, UARFCN 2950"

A 3G icon is placed next to this section to maintain the visual theme described above.

The final section represents 2G technology 914, which may be included for backward compatibility or use in areas where newer technologies are not available. This section may include targets 916 specific to 2G, for example:

"GSM 900, ARFCN 65"

"GSM 1800, ARFCN 540"

A 2G icon completes the set of visual identifiers for each technology section.

To enhance the visual distinction between sections, different colors or background shading can be used for each RAT section. This can help to clearly delineate the different technologies and make the structure of the configuration file immediately apparent.

At the bottom of FIG. 9, a prioritized scanning order 918 for the different RATs and their targets is included. This is shown as a numbered list:

5G NR

LTE

3G

2G

This prioritized order can illustrate how the smart scan technique may be configured to prefer newer, faster technologies while still maintaining the ability to connect to older networks if necessary. Small icons or graphics are shown next to each target within the RAT sections to represent signal strength or priority. These visual cues can help to illustrate how the smart scan technique may optimize the scanning process not just by limiting the scanned frequencies, but also by prioritizing the order in which they are scanned. A legend explaining any symbols or color coding used in the figure is included for clarity and ease of interpretation.

Figure 10:
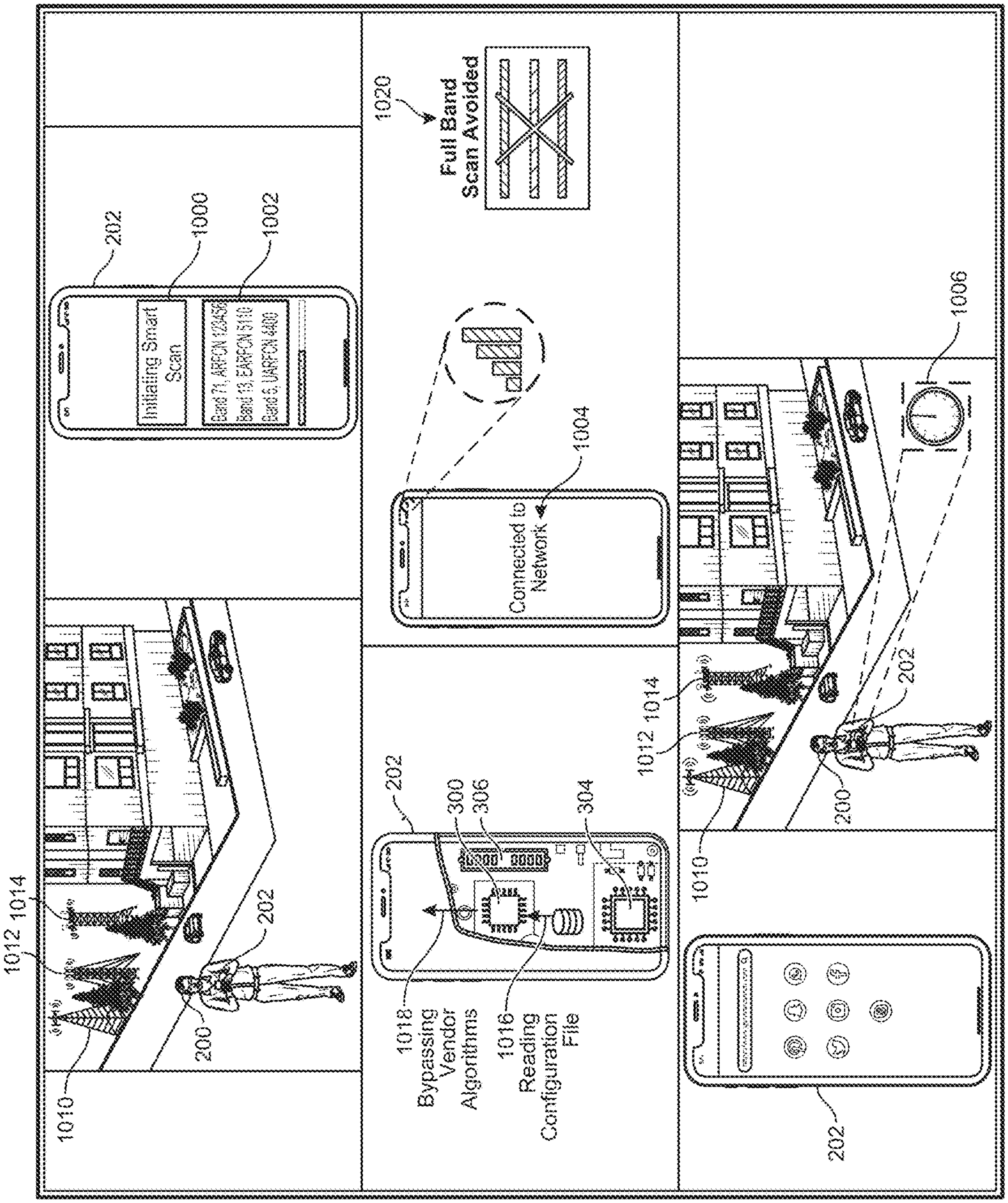
FIG. 10 provides a multi-panel illustration demonstrating the smart scan process in action.

FIG. 10 presents a multi-panel illustration that demonstrates examples of the smart scan process in action, showcasing how a user equipment device may utilize the optimized configuration file to quickly establish a network connection. This figure can help to visualize the practical application of the smart scan technique in real-world scenarios.

The first panel of FIG. 10 depicts a user 200 activating their smartphone 202 in an area with poor network coverage. The background of this panel shows multiple faded cell towers to indicate weak signals from various sources. This setting can help to illustrate a challenging scenario where traditional full band scanning might be particularly time-consuming and inefficient. The user's expression may appear slightly concerned, reflecting the common frustration of trying to connect to a network in an area with poor coverage.

In the second panel, a close-up of the phone's screen 202 is shown. The screen displays a message saying "Initiating Smart Scan" 1000, indicating the beginning of the optimized scanning process. Below this message, a short list of band and ARFCN targets 1002 is visible, representing the limited set of frequencies the device will scan based on the configuration file. This list includes entries such as "Band 71, ARFCN 123456" and "Band 13, EARFCN 5110". A small progress bar is included to indicate that the scan is in progress. This panel can effectively illustrate how the smart scan technique may focus on a specific set of frequencies, potentially reducing the time and power required for network acquisition.

The third panel provides a cutaway view of the phone's internal components, focusing on the modem 300. The embedded file system 302 within the modem is highlighted. An arrow pointing to the modem, labeled "Reading configuration file" 1016, is shown to illustrate how the device accesses the smart scan parameters. Another arrow pointing away from the modem, labeled "Bypassing vendor algorithms" 1018, can demonstrate how the smart scan technique may allow the device to skip related and more time-consuming scanning methods. This panel can help to visualize how the configuration file may be stored and utilized within the device's hardware.

The fourth panel employs a split-screen effect to contrast the outcomes of the smart scan with a traditional full band scan. On one side, the phone is shown successfully connecting to a network, displayed with full signal bars and a "Connected to Network" message 1004. On the other side, a simplified view of a full band scan being bypassed is depicted. This is represented as a long list of frequencies with a large red "X" over it, labeled "Full Band Scan Avoided" 1020. This visual comparison can effectively illustrate the potential time and energy savings offered by the smart scan technique.

In the bottom panels, the user 200 is shown looking satisfied as they use their connected phone. The phone's screen displays a running app or a web page to indicate successful connectivity. In the corner of the screen, a small clock icon 1006 shows a very short connection time (e.g., "Connected in 3s"), emphasizing the speed of the smart scan process. In the background, one of the previously faded cell towers now has strong signal waves, indicating a successful connection to the network. This panel can help to illustrate the end result of the smart scan technique: a faster, more efficient network connection, even in challenging coverage areas.

FIG. 10 can effectively demonstrate how the smart scan process may work in practice, from the user activating their device to quickly connecting to a network. The series of panels can help to visualize the potential benefits of the smart scan technique, including faster connection times and improved efficiency in challenging network environments.

This figure can support several key aspects of the claims. It illustrates how the configuration file may be stored in an embedded file system of a modem in the user equipment device, and how the device may process this file before executing chipset vendor-specific scanning algorithms. The figure also demonstrates how the smart scan technique may enable the user equipment device to bypass a full band scan, potentially reducing the time required for network acquisition from the traditional 90 seconds or more to around 5 seconds, as estimated by the inventors.

Moreover, FIG. 10 can help to visualize how the smart scan technique may improve the user experience by providing faster and more reliable network connections. By showing the process from the user's perspective, the figure can illustrate the practical benefits of the invention in everyday scenarios.

Figure 11:
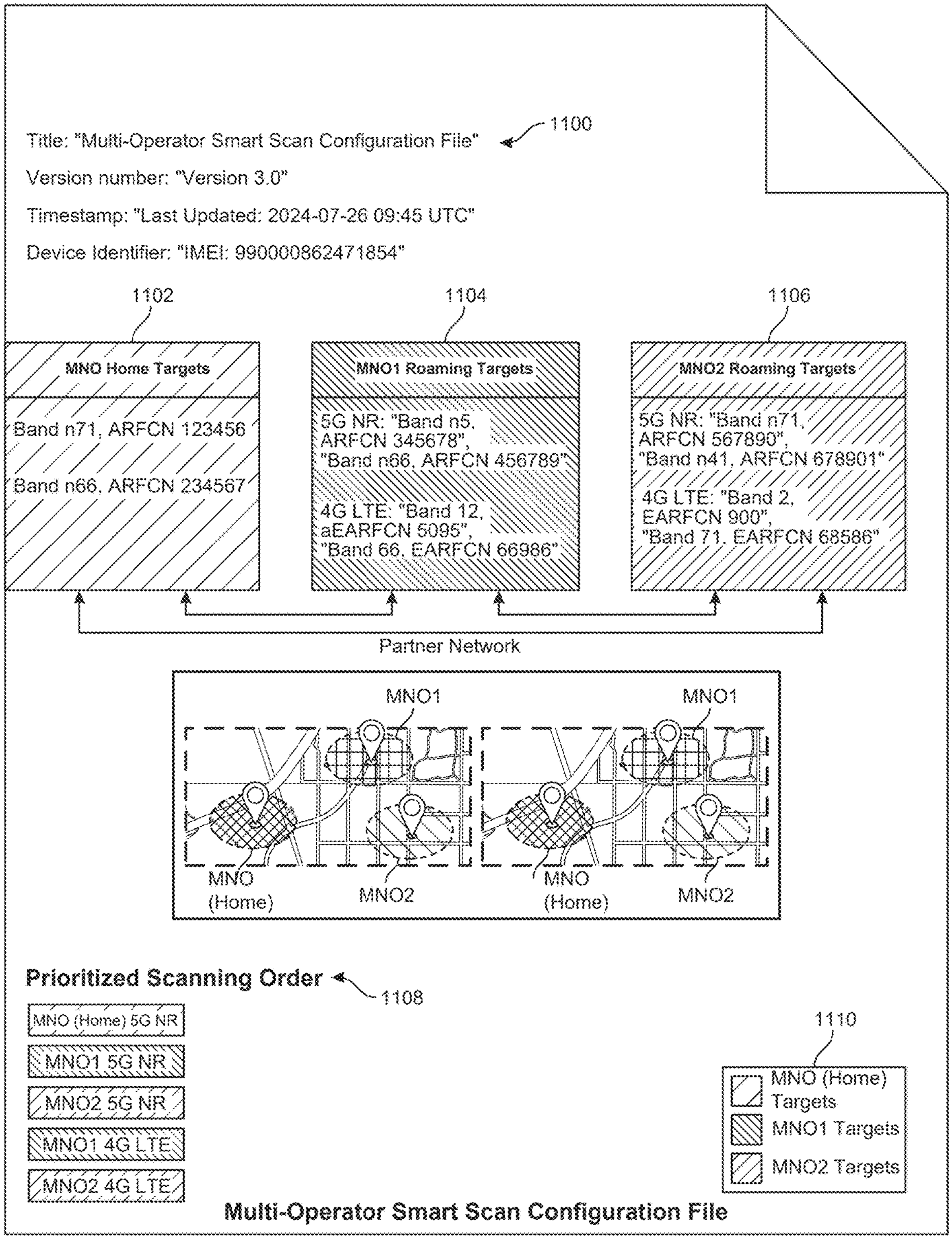
FIG. 11 provides an illustration demonstrating the smart scan process in the context of a mobile virtual network operator that has partnered with a separate mobile network operator.

FIG. 11 presents a detailed technical illustration of a multi-operator configuration file that supports smart scanning across multiple network operators, including an mobile virtual network operator and its partner mobile network operator(s). This figure demonstrates how a single configuration file can enable efficient network acquisition in complex, multi-operator environments.

At the top of FIG. 11, a configuration file header 1100 is prominently displayed. This header contains key information about the configuration file, including its title "Multi-Operator Smart Scan Configuration File," version number "3.0," a timestamp indicating when it was last updated "2024-07-26 09:45 UTC," and a device identifier "IMEI: 990000862471854." The inclusion of this detailed header information allows for precise tracking and management of configuration file versions, which can be important in dynamic network environments where spectrum availability and network configurations may change frequently.

The main body of FIG. 11 is divided into three distinct sections, each representing a different network operator. This structure illustrates how the smart scan technique can be adapted to work across multiple operators, potentially improving the efficiency and reliability of network acquisition in complex roaming scenarios. The first section 1102 is dedicated to the mobile virtual network operator and includes targets for 5G NR (New Radio) technology. Specifically, it lists "Band n71, ARFCN 123456" and "Band n66, ARFCN 234567" as scan targets.

The second section 1104 represents a first mobile network operator, MNO1, which in this example could correspond to a partner network. This section includes scan targets for both 5G NR and 4G LTE technologies. For 5G NR, it lists "Band n5, ARFCN 345678" and "Band n66, ARFCN 456789," while for 4G LTE, it specifies "Band 12, EARFCN 5095" and "Band 66, EARFCN 66986." The inclusion of both 5G and 4G targets in this section demonstrates how the configuration file can support multi-RAT (Radio Access Technology) scanning, allowing devices to efficiently search for the best available network across different generations of cellular technology.

The third section 1106 is allocated to another mobile network operator, MNO2, which could represent another partner network. Like the MNO1 section, this part of the configuration file includes targets for both 5G NR and 4G LTE technologies. The 5G NR targets listed are "Band n71, ARFCN 567890" and "Band n41, ARFCN 678901," while the 4G LTE targets are "Band 2, EARFCN 900" and "Band 71, EARFCN 68586." The presence of this third section in the configuration file illustrates how the smart scan technique can be extended to support multiple partner networks, potentially enabling more comprehensive network coverage and improved roaming capabilities.

At the bottom of FIG. 11, a prioritized scanning order 1108 is displayed. This ordered list shows the sequence in which different operators and their RATs should be scanned: 1. MNO (home) 5G NR, 2. MNO1 5G NR, 3. MNO2 5G NR, 4. MNO1 4G LTE, and 5. MNO2 4G LTE.

This prioritization can help optimize the network acquisition process by focusing first on the preferred network (the MNO home network) and the latest technology (5G NR), before moving on to partner networks and older technologies. Such prioritization can potentially reduce the time and power required for network acquisition, especially in areas with multiple available networks.

FIG. 11 uses different background shading for each operator section, visually distinguishing between the MNO home network and its partner MNOs. This clear delineation can help in quickly identifying which targets belong to which operator, potentially facilitating easier updates and management of the configuration file. A legend 1110 is included at the bottom right corner of FIG. 11, explaining the shading used throughout the figure.

Figure 12:
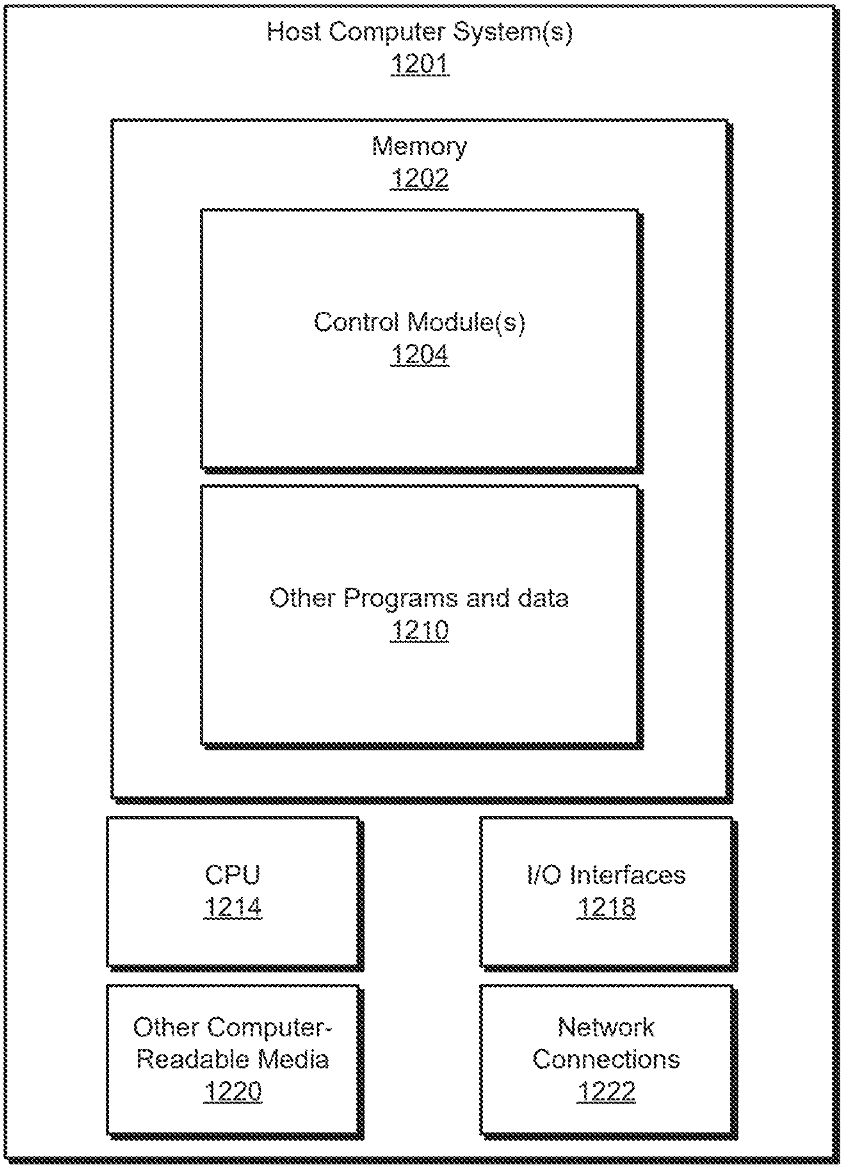
FIG. 12 shows a diagram of an example computing system that may facilitate the performance of one or more of the methods described herein.

FIG. 12 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 12 illustrates an example of underlying hardware on which such software and functionality may be hosted and/or implemented.

In particular, shown is example host computer system(s) 1201. For example, such computer system(s) 1201 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1201 may include memory 1202, one or more central processing units (CPUs) 1214, I/O interfaces 1218, other computer-readable media 1220, and network connections 1222.

Memory 1202 may include one or more various types of non-volatile and/or volatile storage technologies. Examples of memory 1202 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1202 may be utilized to store information, including computer-readable instructions that are utilized by CPU 1214 to perform actions, including those of embodiments described herein.

Memory 1202 may have stored thereon control module(s) 1204. The control module(s) 1204 may be configured to implement and/or perform some or all of the functions of the systems or components described herein. Memory 1202 may also store other programs and data 1210, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1222 are configured to communicate with other computing devices to facilitate the functionality described herein. In various embodiments, the network connections 1222 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1218 may include a video interface, other data input or output interfaces, or the like. Other computer-readable media 1220 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a server of a mobile operator, a location information message from a user equipment device that the user equipment device sent in response to a trigger event indicating a request to establish or re-establish a network connection such that the location information message indicates a location of the user equipment device;

matching, by the mobile operator, the location of the user equipment device that was indicated by the location information message sent by the user equipment device to a specific geofenced area from among a plurality of geofenced areas defined by the mobile operator;

transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

2. The method of claim 1, further comprising determining, by the mobile operator, the limited set of band and absolute radio frequency channel number targets based on spectrum holding information specific to the geofenced area.

3. The method of claim 1, further comprising defining, by the mobile operator, the geofenced area such that the geofenced area corresponds to a Partial Economic Area as defined by the Federal Communications Commission.

4. The method of claim 1, further comprising:

updating, by the mobile operator, the configuration file dynamically based on changes in spectrum availability in the geofenced area; and transmitting, by the mobile operator, the updated configuration file to the user equipment device.

5. The method of claim 1, further comprising transmitting, by the mobile operator, an update to the configuration file using a binary short message service message.

6. The method of claim 5, wherein the binary short message service message is formatted according to the Open Mobile Alliance Client Provisioning (OMA-CP) protocol.

7. The method of claim 5, wherein the binary short service message is sent to a specific configuration port on the user equipment device.

8. The method of claim 1, further comprising defining, by the mobile operator, different configuration files for different geofenced regions based on different spectrum holdings in each of the different geofenced regions.

9. The method of claim 1, further comprising updating, by the mobile operator, the configuration file when the user equipment device moves from one Partial Economic Area to another Partial Economic Area.

10. The method of claim 1, further comprising including, by the mobile operator, band and absolute radio frequency channel number targets for multiple radio access technologies in the configuration file.

11. The method of claim 1, further comprising creating, by the mobile operator, the configuration file as a thin file containing essentially only the band and absolute radio frequency channel number targets.

12. The method of claim 1, further comprising specifying, by the mobile operator, in the configuration file a prioritized order for scanning the limited set of band and absolute radio frequency channel number targets.

13. The method of claim 1, further comprising determining, by the mobile operator, the limited set of band and absolute radio frequency channel number targets based on spectrum holding information that includes data about which portions of bands are available to the mobile operator in the geofenced area.

14. The method of claim 1, further comprising:

detecting, by the mobile operator, that the user equipment device has moved to a new geofenced area; and transmitting, by the mobile operator, a new configuration file corresponding to the new geofenced area to the user equipment device.

15. The method of claim 1, wherein the trigger event comprises at least one of:

device power-on;

loss of network connection;

recovery from airplane mode;

switching between networks;

a periodic network scan in idle mode; or a user-initiated network search.

16. The method of claim 1, further comprising:

storing the configuration file in an embedded file system of a modem in the user equipment device; and configuring the user equipment device to process the configuration file before executing chipset vendor-specific scanning algorithms.

17. A non-transitory computer-readable medium that has instructions stored thereon that, when executed by at least one physical computing processor, cause a computing device to perform operations comprising:

receiving, by a server of a mobile operator, a location information message from a user equipment device that the user equipment device sent in response to the user equipment device powering on such that the location information message indicates a location of the user equipment device;

matching, by the mobile operator, the location of the user equipment device that was indicated by the location information message sent by the user equipment device to a specific geofenced area from among a plurality of geofenced areas defined by the mobile operator;

transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

18. The non-transitory computer-readable medium of claim 17, wherein the operations further comprise determining, by the mobile operator, the limited set of band and absolute radio frequency channel number targets based on spectrum holding information specific to the geofenced area.

19. A system comprising:

at least one physical computing processor of a computing device; and a non-transitory computer-readable medium that has instructions stored thereon that, when executed by the at least one physical computing processor, cause the computing device to perform operations comprising:

receiving, by a server of a mobile operator, a location information message from a user equipment device that the user equipment device sent in response to the user equipment device powering on such that the location information message indicates a location of the user equipment device;

matching, by the mobile operator, the location of the user equipment device that was indicated by the location information message sent by the user equipment device to a specific geofenced area from among a plurality of geofenced areas defined by the mobile operator;

transmitting, by the server of the mobile operator to the user equipment device in response to receiving the location information message, a configuration file that defines a smart scan for the user equipment device by specifying a limited set of band and absolute radio frequency channel number targets that the mobile operator has assigned to the geofenced area based on the mobile operator confirming that the limited set of band and absolute radio frequency channel number targets are available to the user equipment device through the mobile operator in the geofenced area such that the user equipment device is enabled to bypass a full band scan.

20. The non-transitory computer-readable medium of claim 19, wherein the operations further comprise determining, by the mobile operator, the limited set of band and absolute radio frequency channel number targets based on spectrum holding information specific to the geofenced area.

* * * * *